US012095195B2

(12) United States Patent
Kozono et al.

(10) Patent No.: US 12,095,195 B2
(45) Date of Patent: Sep. 17, 2024

(54) CONNECTOR

(71) Applicant: YAZAKI CORPORATION, Tokyo (JP)

(72) Inventors: Seiji Kozono, Kakegawa (JP); Yoshitaka Tsushima, Fujieda (JP); Tomoki Matsukawa, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 316 days.

(21) Appl. No.: 17/710,976

(22) Filed: Mar. 31, 2022

(65) Prior Publication Data

US 2022/0320783 A1 Oct. 6, 2022

(30) Foreign Application Priority Data

Apr. 5, 2021 (JP) ................................ 2021-064368

(51) Int. Cl.
*H01R 13/453* (2006.01)

(52) U.S. Cl.
CPC ..... *H01R 13/4534* (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 5,716,224 A | 2/1998 | Masuda et al. | | |
| 6,786,745 B1 * | 9/2004 | Huang | H01R 13/4534 | 439/373 |
| 7,452,221 B1 * | 11/2008 | Oddsen | H01R 13/4534 | 439/140 |
| 7,651,348 B2 * | 1/2010 | Huang | H01R 13/4534 | 439/137 |
| 7,820,909 B2 * | 10/2010 | Castaldo | H01R 13/4534 | 174/53 |
| 9,059,530 B2 * | 6/2015 | Byrne | H01R 13/4534 | |
| 11,456,555 B1 * | 9/2022 | Lin | H01R 13/4534 | |
| 11,670,887 B2 * | 6/2023 | Yu | H01R 13/4538 | 439/140 |
| 2013/0065421 A1 | 3/2013 | Liu | | |

FOREIGN PATENT DOCUMENTS

| | | |
|---|---|---|
| EP | 3680987 A1 | 7/2020 |
| JP | H08-138785 A | 5/1996 |

* cited by examiner

*Primary Examiner* — Felix O Figueroa
(74) *Attorney, Agent, or Firm* — KENEALY VAIDYA LLP

(57) ABSTRACT

A connector includes a housing configured to accommodate a connection terminal, a slide shutter configured to open and close a front opening of the housing to which a mating connector is to be fitted, a first shutter inclined surface provided on the slide shutter, and a housing inclined surface provided on the housing so as to face the first shutter inclined surface and configured to slide the slide shutter in a direction intersecting a connector fitting direction to open the front opening in accordance with a pressing force applied in the connector fitting direction by the mating connector.

3 Claims, 12 Drawing Sheets

CONNECTOR

CROSS-REFERENCE TO RELATED APPLICATIONS

This application is based on and claims priority under 35 USC 119 from Japanese Patent Application No. 2021-064368 filed on Apr. 5, 2021, the contents of which are incorporated herein by reference.

TECHNICAL FIELD

The present invention relates to a connector including a shutter mechanism.

BACKGROUND ART

In related art, a wire harness (electric wire) for electrically connecting various electrical components mounted on an automobile or the like performs connection by a connector. Such a connector is usually configured by a male connector and a female connector. For example, in the case of a connector structure applied to optional specifications, one connector connected to an end portion of an electric wire has a shutter mechanism at a front opening of a housing of the one connector for purposes such as dust prevention, terminal protection, prevention of electric shock to the surroundings, and the like until the other connector is fitted to the one connector. In particular, a shutter-mechanism-equipped connector (inlet) is used in an electric vehicle or the like in order to prevent an electric shock accident or the like, and exposure of a terminal at a front opening of the connector when the connector is not connected to a mating connector. As an example of such a configuration, JP-A-H8-138785 discloses a shutter-mechanism-equipped connector, for example.

According to the shutter-mechanism-equipped connector, one connector has a shutter that rotates outward when an external force is applied to a front surface portion of the shutter, the other connector has a tip end portion such that the tip end portion presses the front surface portion of the shutter of the one connector to rotate the shutter when fitting with the connector.

Incidentally, in the shutter-mechanism-equipped connector disclosed in JP-A-H8-138785, when fitting with the connector, a tip end portion (fitting hood portion) of a mating connector pushes the front surface portion of the shutter, so that the shutter is rotated outward (forward) around a pin and is opened. Therefore, it is necessary to set a stroke (connector size) of the mating connector in consideration of an opening rotation trajectory of the shutter so as to avoid interference when fitting with the connector. Therefore, the fitting hood portion of the mating connector is lengthened due to space for the shutter to open and close, and thus the connector size is increased.

In addition, the shutter is constantly urged toward an inside of the housing by a coil spring (spring), and is configured to close the front opening of the housing when the connector is not fitted. As the coil spring that constantly urges the shutter in a closing direction of the shutter, for example, a torsion coil spring wound around a pin that pivotally supports the shutter is used. Therefore, the coil spring is located in the vicinity of the front opening of the housing, and thus is easily affected by dust, water, and the like. Therefore, the shutter-mechanism-equipped connector in the related art is prone to increased risk of a spring function failure.

SUMMARY OF INVENTION

The present invention has been made in view of the above circumstances, and an object thereof is to provide a compact connector that ensures a spring function of a shutter-mechanism-equipped connector.

The above object of the present invention is achieved by the following configurations.

Aspect of non-limiting embodiments of the present disclosure relates to provide a connector including:

- a housing configured to accommodate a connection terminal;
- a slide shutter configured to open and close a front opening of the housing to which a mating connector is to be fitted;
- a first shutter inclined surface provided on the slide shutter; and
- a housing inclined surface provided on the housing so as to face the first shutter inclined surface and configured to slide the slide shutter in a direction intersecting a connector fitting direction to open the front opening in accordance with a pressing force applied in the connector fitting direction by the mating connector.

According to the above configuration, it is possible to provide the compact connector that ensures the spring function of the shutter-mechanism-equipped connector.

The present invention has been briefly described above. Further, details of the present invention will be further clarified by reading through an embodiment described below (hereinafter referred to as the "embodiment") with reference to the accompanying drawings.

DESCRIPTION OF EMBODIMENTS

Hereinafter, an example of an embodiment according to the present invention will be described with reference to the drawings.

Figure 1:
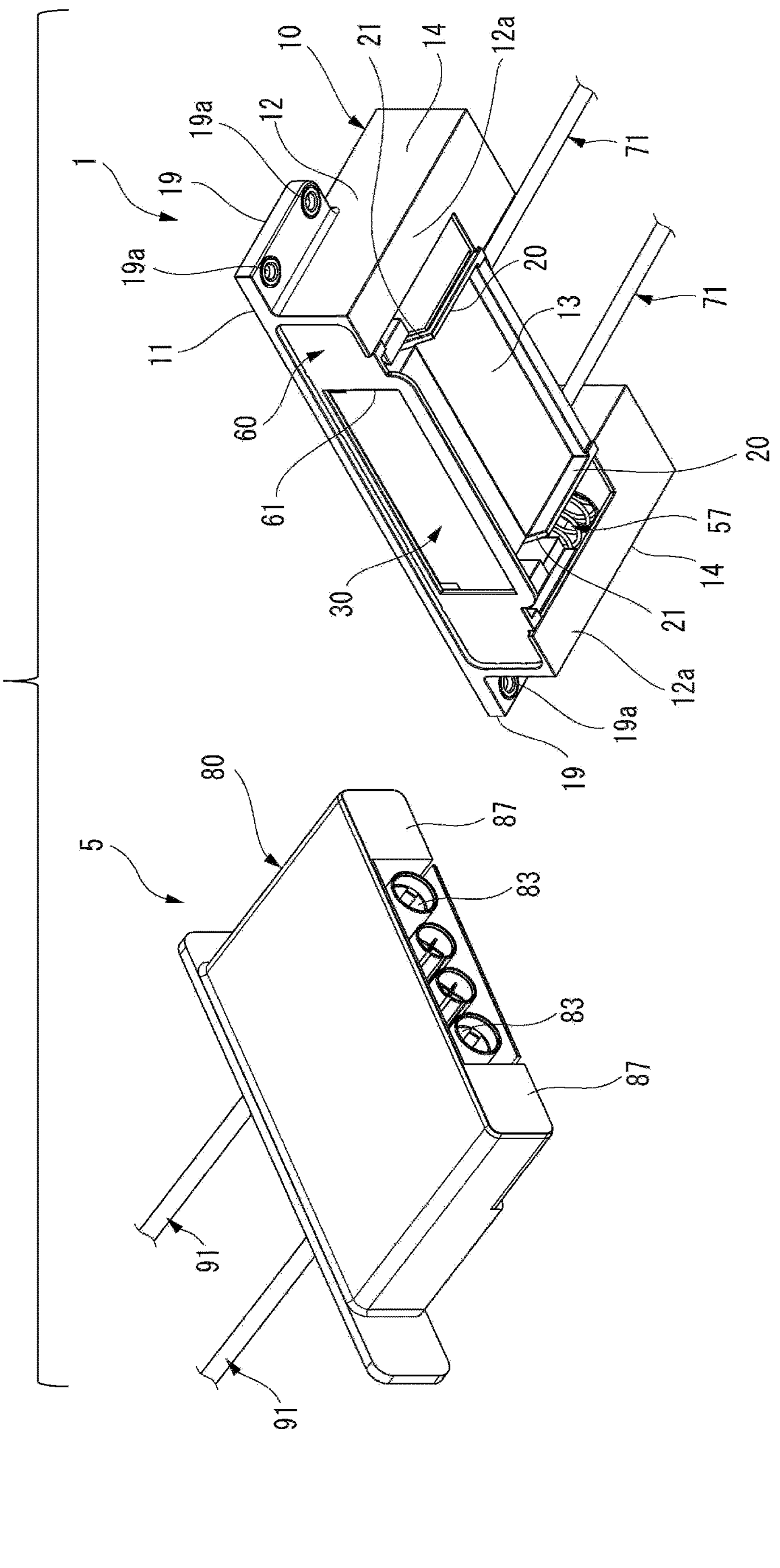
FIG. 1 is a perspective view showing an inlet constituting a connector according to an embodiment of the present invention and an inlet plug that is a mating connector to be fitted to the inlet.
Figure 2:
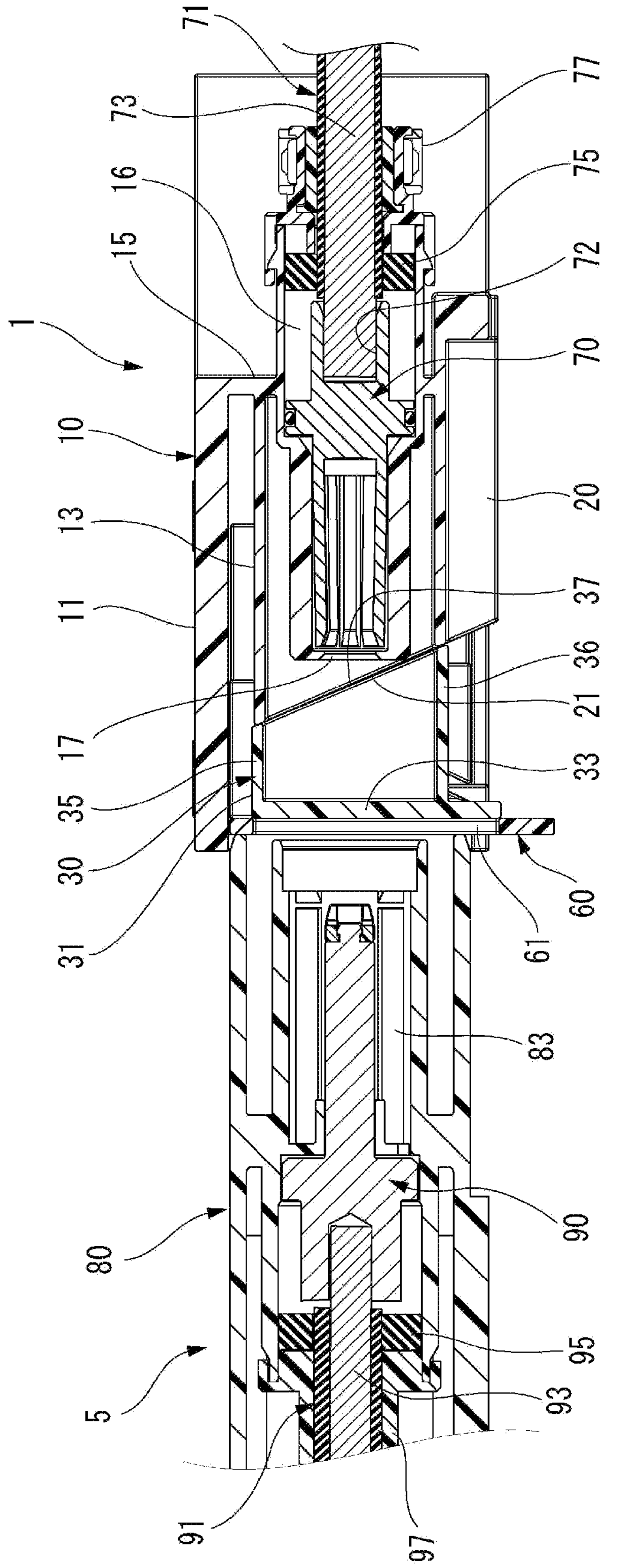
FIG. 2 is a vertical cross-sectional view of connection terminal portions in the inlet and the inlet plug.

FIG. 1 is a perspective view showing an inlet 1 constituting a connector according to the embodiment of the present invention and an inlet plug 5 that is a mating connector to be fitted to the inlet 1. FIG. 2 is a vertical cross-sectional view of connection terminal portions in the inlet 1 and the inlet plug 5.

As shown in FIGS. 1 and 2, the inlet 1, which is the connector according to the present embodiment, includes a housing 10. A plug housing 80 of the inlet plug (mating connector) 5 is fitted to the housing 10. As a result, a connection terminal 70 accommodated in the inlet 1 and a connection terminal 90 accommodated in the inlet plug 5 are electrically connected to each other.

In the present specification, a front-rear direction is a direction along a connector fitting direction (left-right direction in FIG. 2) of the housing 10, a side where the plug housing 80 of the inlet plug 5 is fitted is defined as a front side, and an up-down direction is a direction orthogonal to the connector fitting direction of the housing 10 (up-down direction in FIG. 2).

Figure 3:
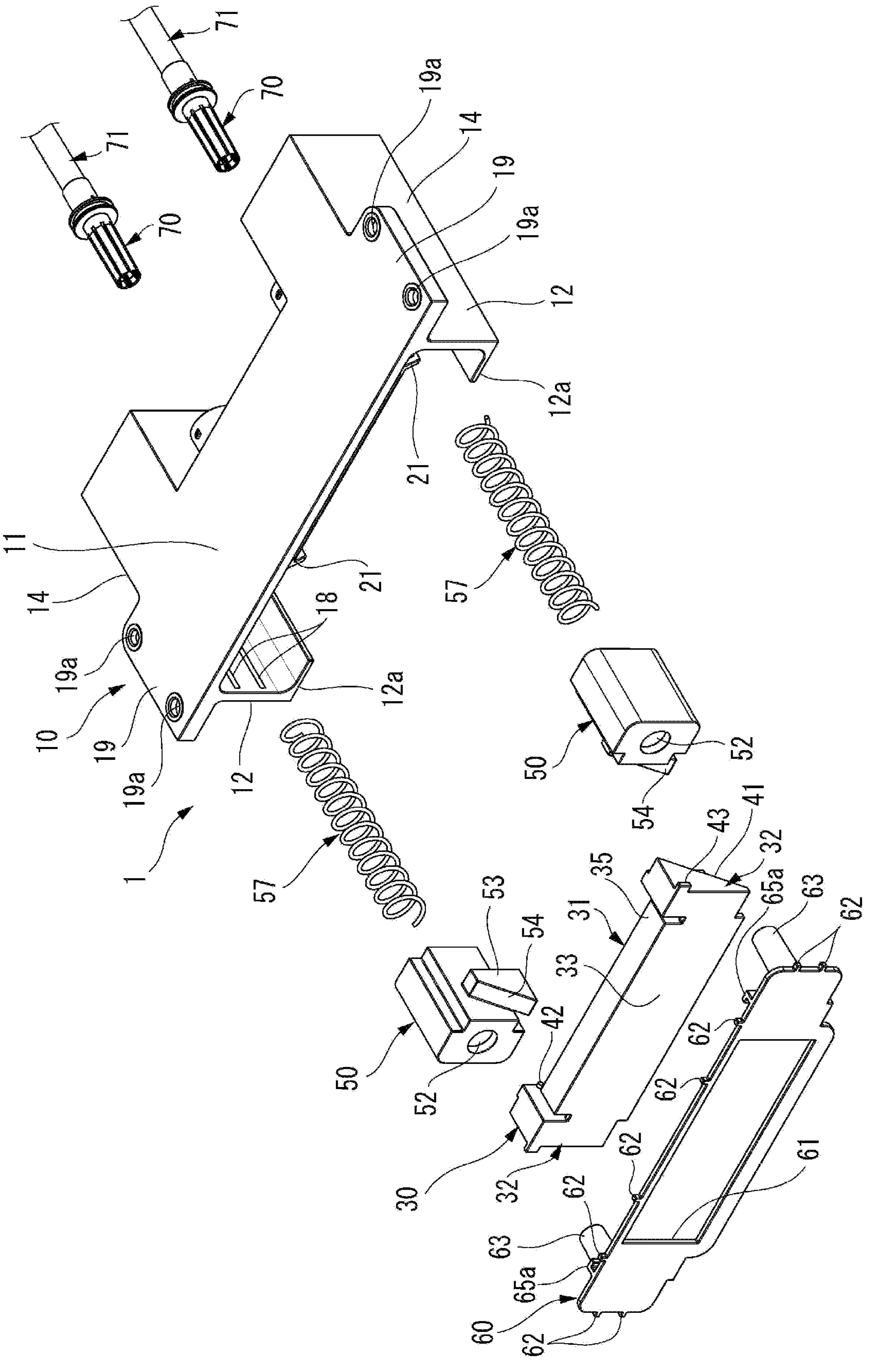
FIG. 3 is an exploded perspective view of the inlet.
Figure 4:
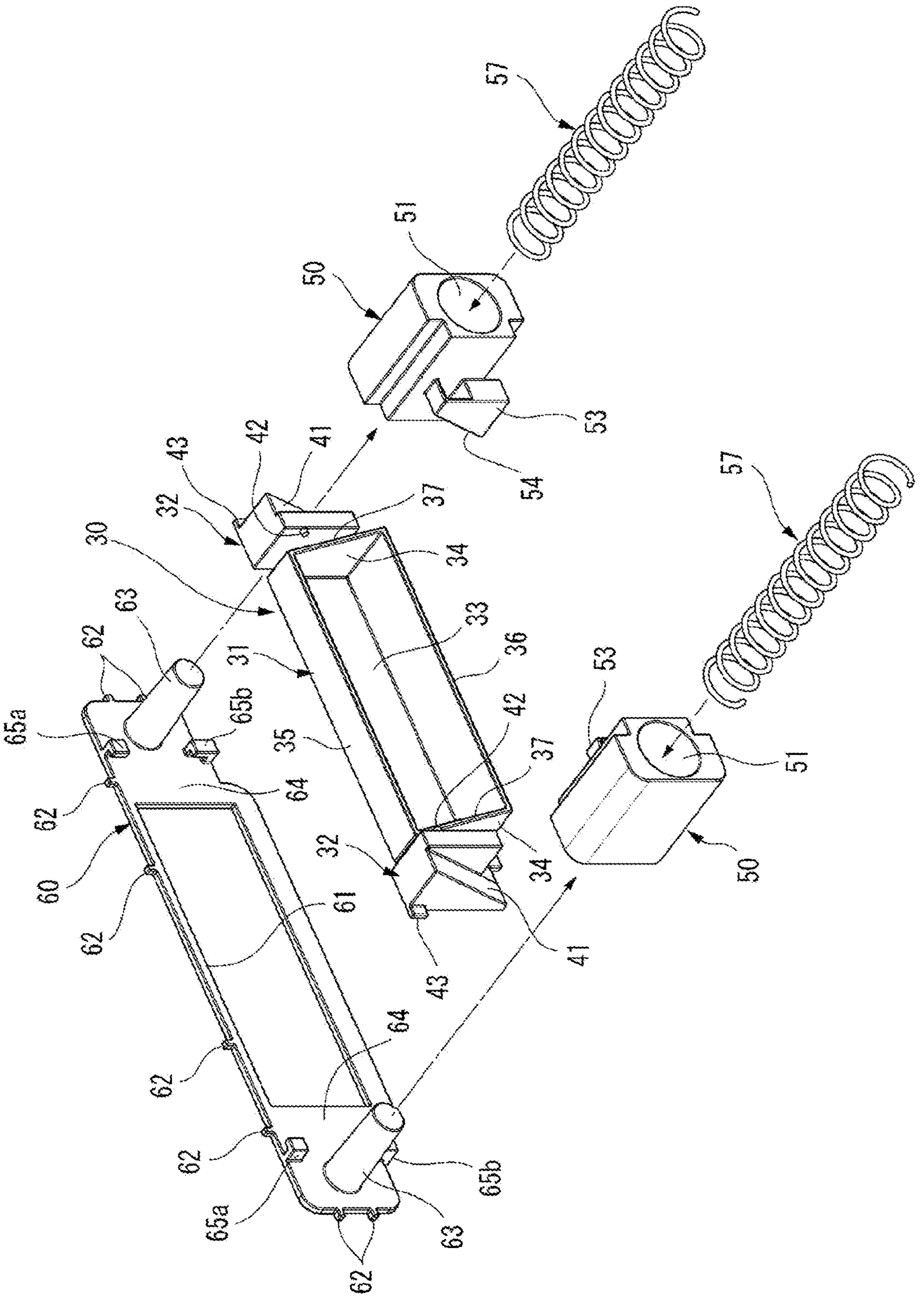
FIG. 4 is an exploded perspective view of components assembled to a housing of the inlet.
Figure 5:
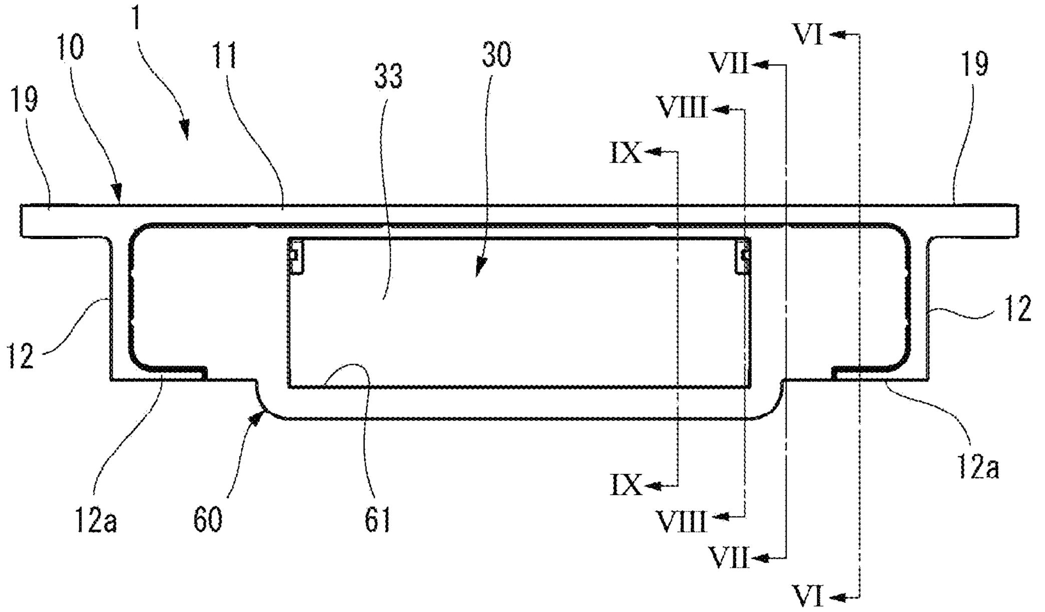
FIG. 5 is a front view of the inlet.
Figure 6:
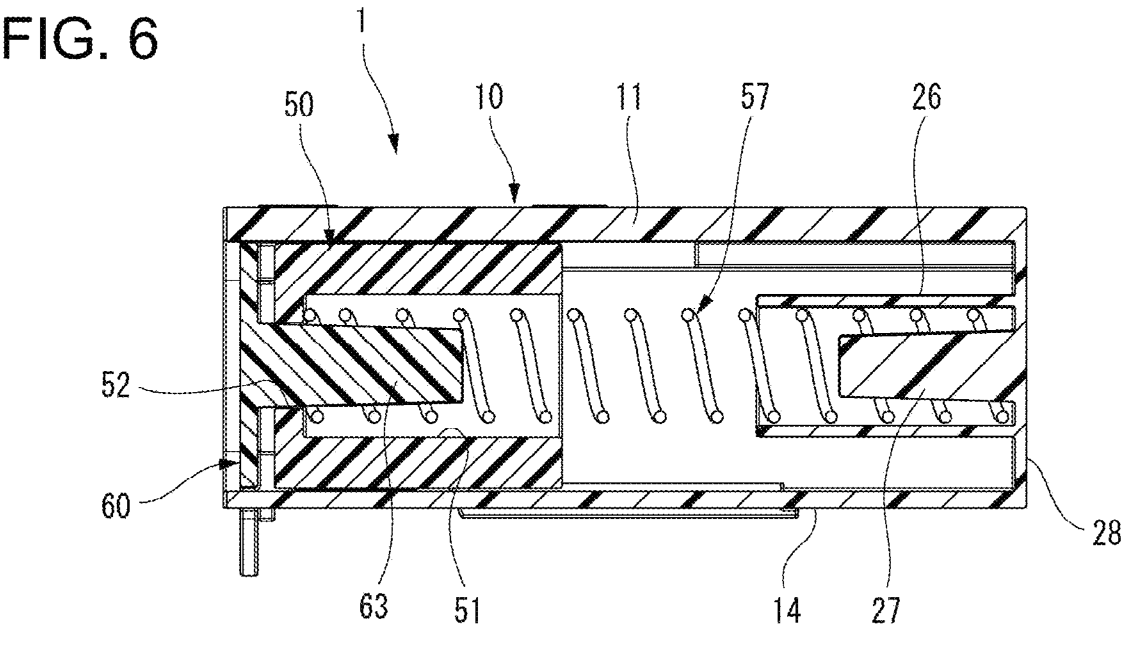
FIG. 6 is a cross-sectional view taken along line VI-VI of FIG. 5.
Figure 7:
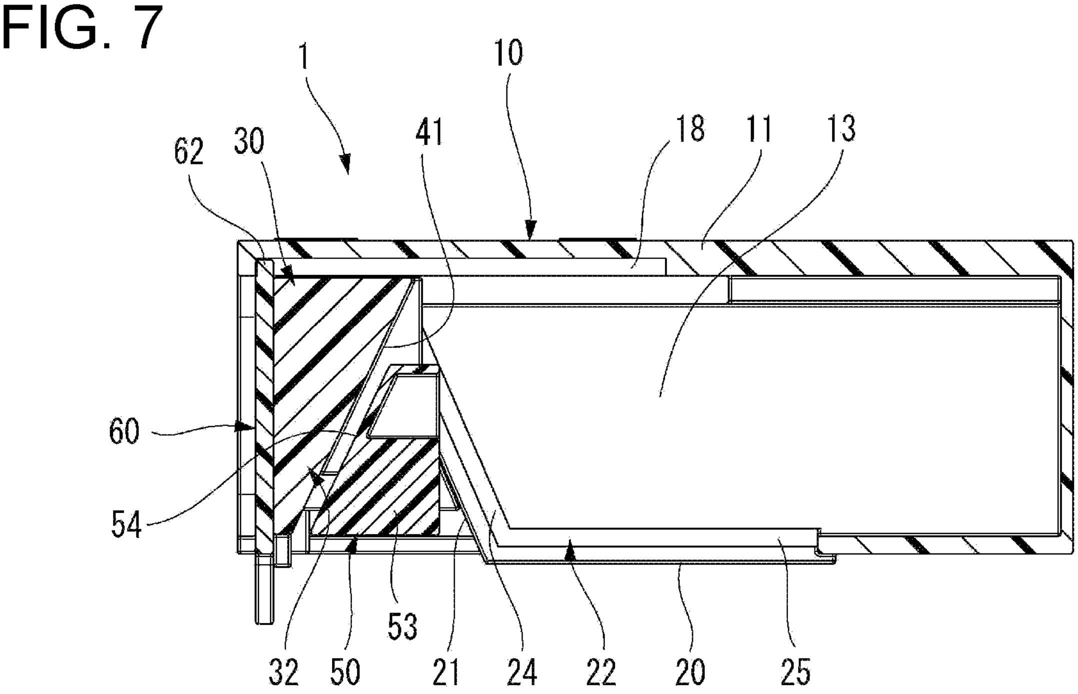
FIG. 7 is a cross-sectional view taken along line VII-VII of FIG. 5.
Figure 8:
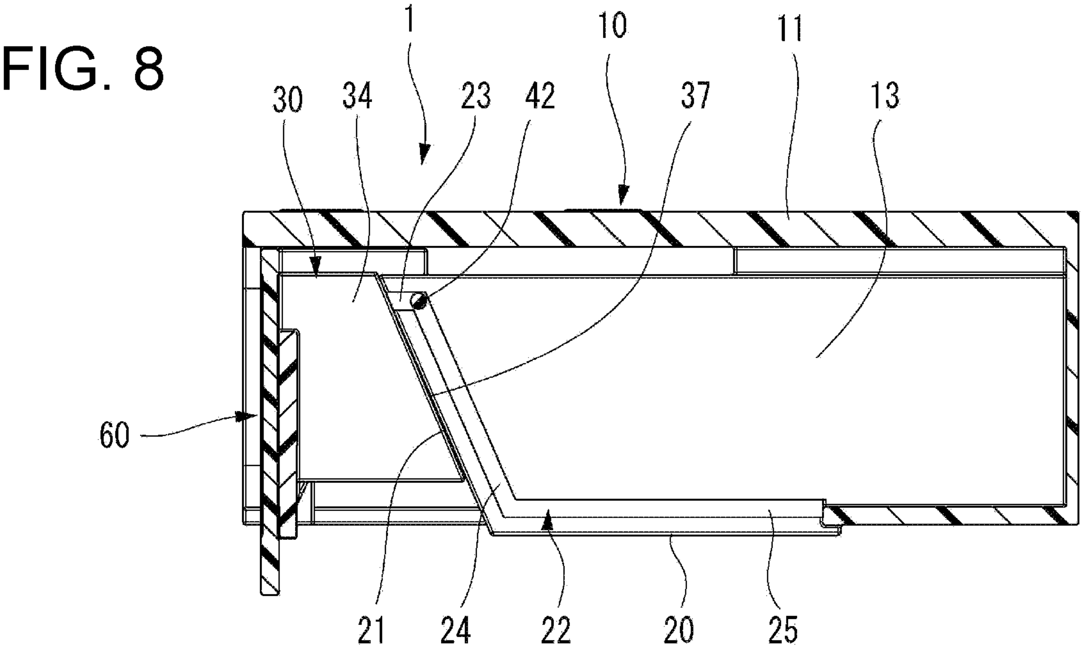
FIG. 8 is a cross-sectional view taken along line VIII-VIII of FIG. 5.
Figure 9:
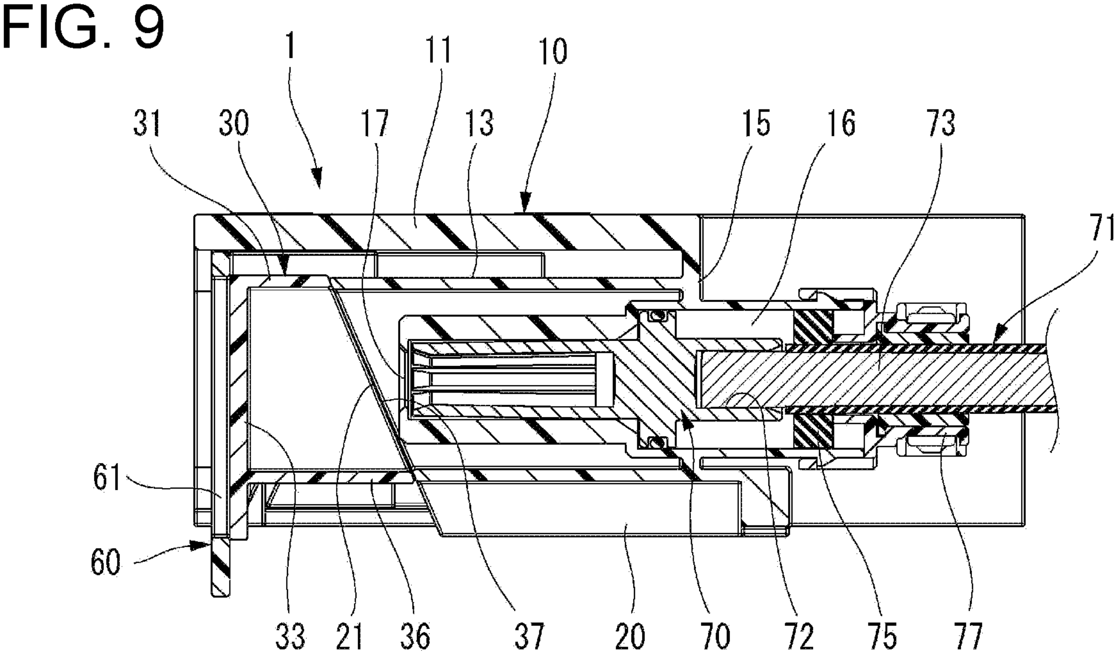
FIG. 9 is a cross-sectional view taken along line IX-IX of FIG. 5.

FIG. 3 is an exploded perspective view of the inlet 1. FIG. 4 is an exploded perspective view of components assembled to the housing 10 of the inlet 1. FIG. 5 is a front view of the inlet 1. FIG. 6 is a cross-sectional view taken along line V-V of FIG. 5. FIG. 7 is a cross-sectional view taken along line VI-VI of FIG. 5. FIG. 8 is a cross-sectional view taken along line VII-VII of FIG. 5. FIG. 9 is a cross-sectional view taken along line VIII-VIII of FIG. 5.

As shown in FIGS. 3 to 9, the inlet 1 includes the housing 10, a slide shutter 30, a holder 50, a spring (elastic member) 57, and a front cover 60.

The housing 10 is formed of an electrically insulating synthetic resin. The housing 10 includes an upper wall portion 11, a pair of side wall portions 12 extending downward from two edge portions of the upper wall portion 11, and a terminal accommodating portion 13 provided in a central portion of the housing 10. The housing 10 further includes a holder accommodating portion 14 between each side wall portion 12 and the terminal accommodating portion 13. The terminal accommodating portion 13 is formed integrally with a rear wall 15 of the housing 10. A pair of terminal accommodating chambers 16 are provided in the terminal accommodating portion 13. Front surface openings 17, which are front openings of the housing 10, are formed in front ends of the terminal accommodating chambers 16.

The housing 10 includes a plurality of engagement groove portions 18 that are formed along the front-rear direction on an inner surface side of the upper wall portion 11 and an inner surface side of each side wall portion 12. The engagement grooves 18 are not opened at a front end of the housing 10. In addition, the housing 10 includes fixing portions 19 protruding laterally on the upper wall portion 11. Hole portions 19*a* through which attachment screws (not shown) pass are formed in the fixing portions 19.

A lower edge of each side wall portion 12 of the housing 10 includes a protruding portion 12*a* protruding inward along the front-rear direction. As a result, in the housing 10, both side portions of the terminal accommodating portion 13 are formed into a concave shape due to the upper wall portion 11, the side wall portions 12, and the protruding portions 12*a*. Such a concave-shaped portion constitutes a front side of each holder accommodating portion 14.

The connection terminal 70, which is connected to an end portion of a high-voltage cable 71, is accommodated in each terminal accommodating chamber 16. Each front surface opening 17 into which the connection terminal 90 of the inlet plug 5 is inserted is formed in the front end of each terminal accommodating chamber 16. The high-voltage cable 71 connected to the connection terminal 70 is drawn out from a rear end opening of each terminal accommodating chamber 16.

The connection terminal 70 is a female terminal formed of a conductive metal material, and is constituted by a plurality of flexible pieces arranged in a cylindrical shape. A joining hole 72 is formed in a rear end portion of the connection terminal 70. A conductor 73 of the high-voltage cable 71 drawn out from the rear end opening of the terminal accommodating chamber 16 is inserted into the joining hole 72, crimped and connected thereto (see FIGS. 2 and 9).

A seal member 75 is mounted to the high-voltage cable 71 drawn out from the rear end opening of the terminal accommodating chamber 16, and thus the high-voltage cable 71 is liquid-tightly sealed relative to the terminal accommodating chamber 16. Detachment of the seal member 75 is restricted by a rear holder 77 mounted to a rear end of the terminal accommodating portion 13 (see FIGS. 2 and 9).

Guide plate portions 20 are formed on the both side portions of the terminal accommodating portion 13 including the terminal accommodating chamber 16. Lower edges of the guide plate portions 20 protrude downward relative to a lower surface of the terminal accommodating portion 13.

End surfaces on a front end side of the guide plate portions 20 forms housing inclined surfaces 21. Each housing inclined surface 21 is an inclined surface that is gradually inclined downward toward the rear of the housing 10.

In addition, a guide groove 22 is formed in an outer surface of each guide plate portion 20. The guide groove 22 includes, in order from the front end side, an introduction groove portion 23, an inclined groove portion 24, and a horizontal groove portion 25, which communicate with each other. The introduction groove portion 23 is opened at a front end of the guide plate portion 20. The inclined groove portion 24 extends in a direction gradually inclined downward toward the rear of the housing 10, and is formed to be parallel to the housing inclined surface 21. The horizontal groove portion 25 extends along the front-rear direction of the housing 10 and is formed to be parallel to the lower edge of the guide plate portion 20.

Each holder accommodating portion 14 protrudes toward the rear side of the housing 10 relative to the rear end of the terminal accommodating portion 13. As shown in FIG. 6, inside the holder accommodating portion 14, a holding cylinder portion 26, which is formed in a cylindrical shape, and a rod-shaped holding pin 27 arranged at a center of the holding cylinder portion 26 are provided on a rear end side. The holding cylinder portion 26 and the holding pin 27 are formed integrally with a rear wall 28 of the holder accommodating portion 14.

As shown in FIGS. 3 and 4, the slide shutter 30 includes a cover portion 31 and a pair of block portions 32. The slide shutter 30 is mounted to the housing 10 from a front side of the housing 10.

A rear side of the cover portion 31, which is a side to be mounted to the housing 10, is formed in a concave shape.

The cover portion 31 includes a front surface plate portion 33, side surface plate portions 34 provided on both side portions of the front surface plate portion 33, an upper surface plate portion 35 formed on an upper edge portion of the front surface plate portion 33, and a lower surface plate portion 36 formed on a lower edge portion of the front surface plate portion 33. An end surface on a side to be mounted to the housing 10 of each side surface plate portion 34 of the cover portion 31 forms a first shutter inclined surface 37. The first shutter inclined surface 37 is an inclined surface that is gradually inclined downward toward the rear, which is the side to be mounted to the housing 10, and has the same inclination angle as the housing inclined surface 21. When the slide shutter 30 is mounted to the housing 10, the first shutter inclined surface 37 is abutted against the housing inclined surface 21.

The block portions 32 are formed integrally with both side portions of the cover portion 31. Each block portion 32 includes a second shutter inclined surface 41 on the side to be mounted to the housing 10. The second shutter inclined surface 41 is an inclined surface that is gradually inclined upward toward the rear, which is the side to be mounted to the housing 10. That is, the second shutter inclined surface 41 is an inclined surface inclined in a direction opposite to the first shutter inclined surface 37.

A guide protrusion 42 protrudes from the block portion 32 at an upper position on an inner side surface thereof on the side of the cover portion 31. The guide protrusion 42 is formed on the block portion 32 at a position in the vicinity of the first shutter inclined surface 37 of the cover portion 31.

In addition, an engagement piece 43 protrudes from the block portion 32 on an outer side surface opposite to the cover portion 31. The engagement piece 43 is formed at a corner portion between a front edge and an upper edge of the outer side surface of the block portion 32.

As shown in FIGS. 3 and 4, the holder 50 is accommodated in the holder accommodating portion 14 of the housing 10 from the front side of the housing 10, and is disposed on each of both side portions of the slide shutter 30 mounted to the housing 10. In each holder 50, a holding hole 51 is formed in a rear surface thereof, and an insertion hole 52 is formed in a front surface thereof. The holding hole 51 has a larger diameter than the insertion hole 52, and the holding hole 51 and the insertion hole 52 communicate with each other.

Further, the holder 50 is provided with a pressing convex portion 53 on an inner side surface thereof on the side of the slide shutter 30. The pressing convex portion 53 includes a holder inclined surface 54 on a front surface side thereof. The holder inclined surface 54 is an inclined surface that is gradually inclined upward toward the rear, and has the same inclination angle as the second shutter inclined surface 41 formed on the block portion 32 of the slide shutter 30. In a state where the holder 50 is accommodated in the holder accommodating portion 14, the holder inclined surface 54 is abutted against the second shutter inclined surface 41 of the block portion 32 of the slide shutter 30 mounted to the housing 10.

The spring 57 is formed of a compression coil spring, and is inserted into the holder accommodating portion 14 of the housing 10 from the front side of the housing 10 and is accommodated therein. A rear end of the spring 57 is inserted into the holding cylinder portion 26. As a result, the holding pin 27 is inserted into the rear end side of the spring 57. The rear end of the spring 57 is held on the rear end side of the holder accommodating portion 14 by the holding cylinder portion 26 and the holding pin 27. In addition, a front end side of the spring 57 is inserted into the holding hole 51 of the holder 50 mounted to the holder accommodating portion 14 of the housing 10.

As shown in FIGS. 3 and 4, the front cover 60 is formed in a plate shape that includes an opening portion 61, and is fitted and mounted to the housing 10 from the front side thereof.

Engagement claws 62 are formed on an upper edge portion and side edge portions of the front cover 60. When the front cover 60 is mounted to the housing 10, each engagement claw 62 is engaged with the engagement groove portion 18 of the housing 10. As a result, the engagement claw 62 is engaged and guided by the engagement groove portion 18, and thus the front cover 60 is slidable in the front-rear direction of the housing 10. Since the engagement groove portion 18 is not opened at the front end of the housing 10, the engagement claw 62 is engaged with the engagement groove portion 18, and thus the front cover 60 mounted to the housing 10 is prevented from coming off.

Insertion pins 63 protrude on a surface of the front cover 60 on the side to be mounted to the housing 10 in the vicinity of both ends of the front cover 60. Each insertion pin 63 is inserted into the insertion hole 52 of the holder 50.

A sliding contact surface 64 is formed between the opening portion 61 and each insertion pin 63 on the surface of the front cover 60 on the side to be mounted to the housing 10. A front surface side of each block portion 32 of the slide shutter 30 is abutted against each sliding contact surface 64. In addition, an upper engagement portion **65*a* and a lower engagement portion 65*b* are arranged in the up-down direction between the sliding contact surface 64 of the front cover 60 and the insertion pin 63. Each engagement piece 43 formed on the block portion 32 of the slide shutter 30 can be engaged with each of the upper engagement portion 65*a* and the lower engagement portion 65*b***.

Since the slide shutter 30, the holder 50, and the front cover 60 are in sliding contact with each other, the slide shutter 30, the holder 50, and the front cover 60 are preferably formed of a resin material having satisfactory sliding performance and excellent wear resistance.

In order to assemble the inlet 1 having the above-described configuration, first, the spring 57 and the holder 50 are sequentially inserted into and accommodated in each holder accommodating portion 14 of the housing 10 that accommodates the connection terminal 70. Then, the rear end of the spring 57 is held on the rear end side of the holder accommodating portion 14 by the holding cylinder portion 26 and the holding pin 27, while the front end side of the spring 57 is inserted and held in the holding hole 51 of the holder 50.

Next, the slide shutter 30 is fitted between the holder accommodating portions 14 from the front side of the housing 10. Further, the front cover 60 is mounted from the front side of the housing 10, and each engagement claw 62 of the front cover 60 is engaged with each engagement groove portion 18 of the housing 10. When the front cover 60 is mounted to the housing 10, the engagement piece 43 of the slide shutter 30 is engaged with the upper engagement portion **65*a* of the front cover 60**.

According to the inlet 1 assembled in this manner, the first shutter inclined surface 37 of the slide shutter 30 is disposed to face the housing inclined surface 21 of the housing 10, and the second shutter inclined surface 41 of the slide shutter 30 is disposed to face the holder inclined surface 54 of the holder 50. In addition, front surfaces of both end portions of the slide shutter 30 are abutted against each sliding contact surface 64 of the front cover 60. Further, the guide protrusion 42 of the slide shutter 30 is inserted into the introduction groove portion 23 of the guide groove 22 of the guide plate portion 20 of the housing 10. In addition, each insertion pin 63 of the front cover 60 is inserted into the insertion hole 52 of each holder 50 and a front end portion of the spring 57.

In the inlet 1, the opening portion 61 of the front cover 60 is closed by the slide shutter 30, and the front surface opening 17 of the terminal accommodating chamber 16 in the terminal accommodating portion 13 is covered by the slide shutter 30. As a result, the connection terminal 70 is prevented from being exposed at the front surface opening 17 when the inlet 1 is not connected.

The assembled inlet 1 is attached to, for example, a vehicle body of an electric vehicle by a screw inserted into the hole portion 19*a* of each fixing portion 19 formed in the upper wall portion 11 of the housing 10. Here, although the up-down direction of the vehicle body is the up-down direction of the inlet 1 at the time of attachment to the vehicle body, the attachment direction is not limited thereto.

As shown in FIGS. 1 and 2, the inlet plug 5 to be fitted and electrically connected to the inlet 1 includes the connection terminal 90 to be fitted to the connection terminal 70 of the inlet 1, and the plug housing 80 that includes a pair of terminal accommodating chambers 83 for accommodating the connection terminal 90.

The plug housing 80 is formed of an electrically insulating synthetic resin. Both end portions of a front end surface of the plug housing 80 serve as pressing surfaces 87 that face a front surface of the front cover 60 and can press and urge the front surface of the front cover 60.

The connection terminal 90, which is connected to an end portion of a high-voltage cable 91, is accommodated in each terminal accommodating chamber 83. The high-voltage cable 91 connected to the connection terminal 90 is drawn out from a rear end opening of each terminal accommodating chamber 83.

The connection terminal 90 is a male terminal formed of a conductive metal material, and is formed in a cylindrical rod shape. A joining hole 92 is formed in a rear end portion of the connection terminal 90. A conductor 93 of the high-voltage cable 91 drawn out from the rear end opening of the terminal accommodating chamber 83 is inserted into the joining hole 92, crimped and connected thereto.

A seal member 95 is mounted to the high-voltage cable 91 drawn out from the rear end opening of the terminal accommodating chamber 83, and thus the high-voltage cable 91 is liquid-tightly sealed relative to the terminal accommodating chamber 83. Detachment of the seal member 95 is restricted by a rear holder 97 mounted to a rear end of the terminal accommodating chamber 83.

Next, a case where the inlet plug 5 is fitted to and detached from the inlet 1 having the above-described configuration will be described.

Figure 10:
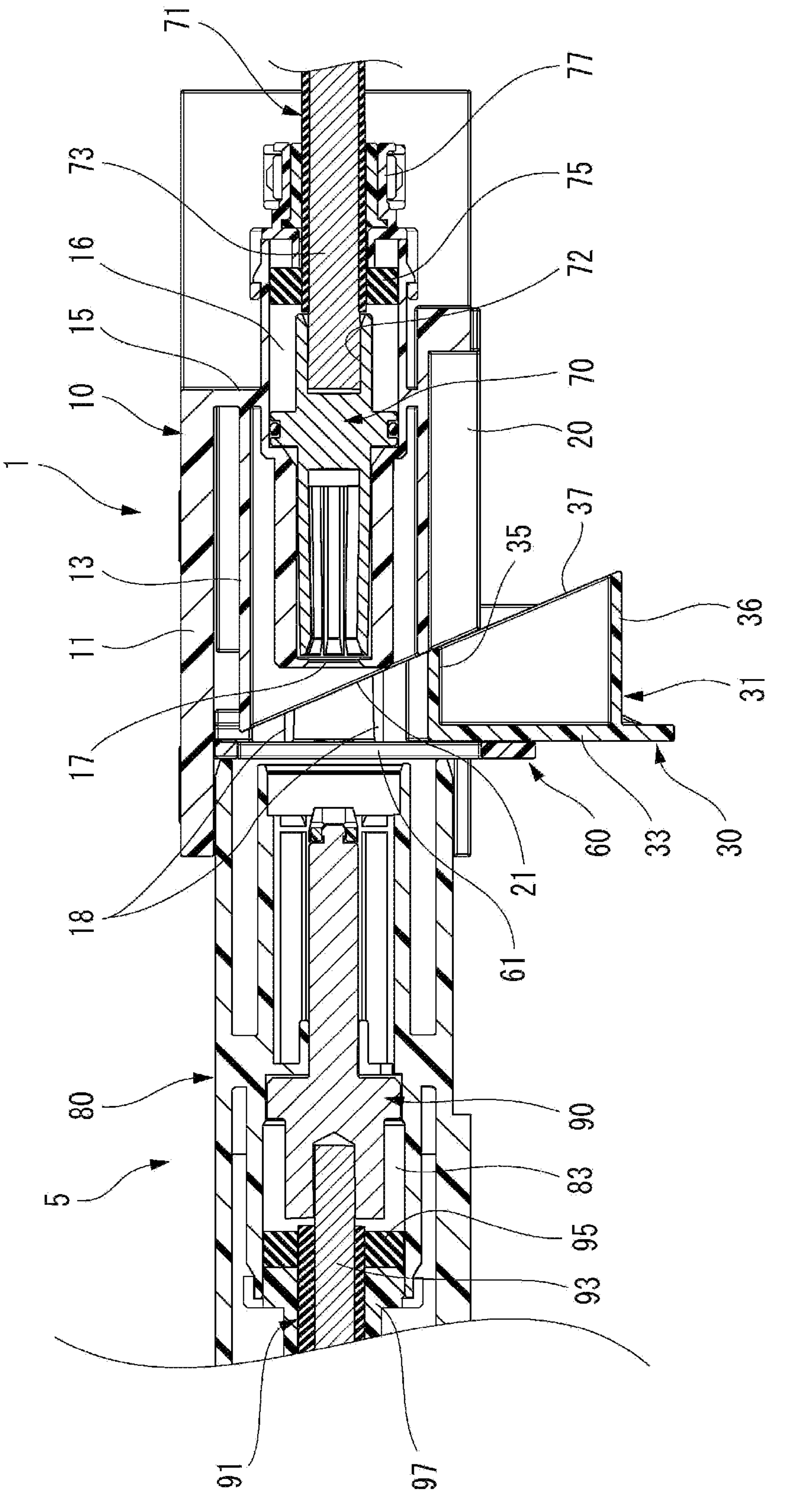
FIG. 10 is a vertical cross-sectional view of the connection terminal portion between the inlet and the inlet plug when fitting is started.
Figure 11:
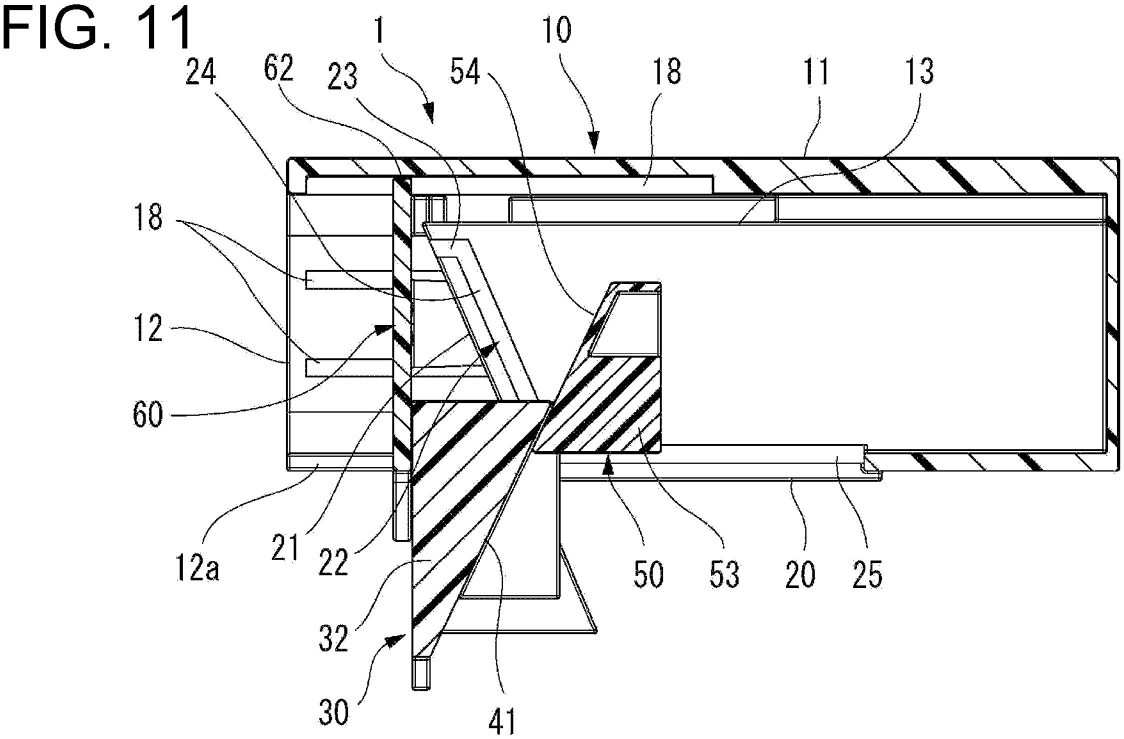
FIG. 11 is a cross-sectional view taken along line VII-VII of FIG. 5 when fitting is started.
Figure 12:
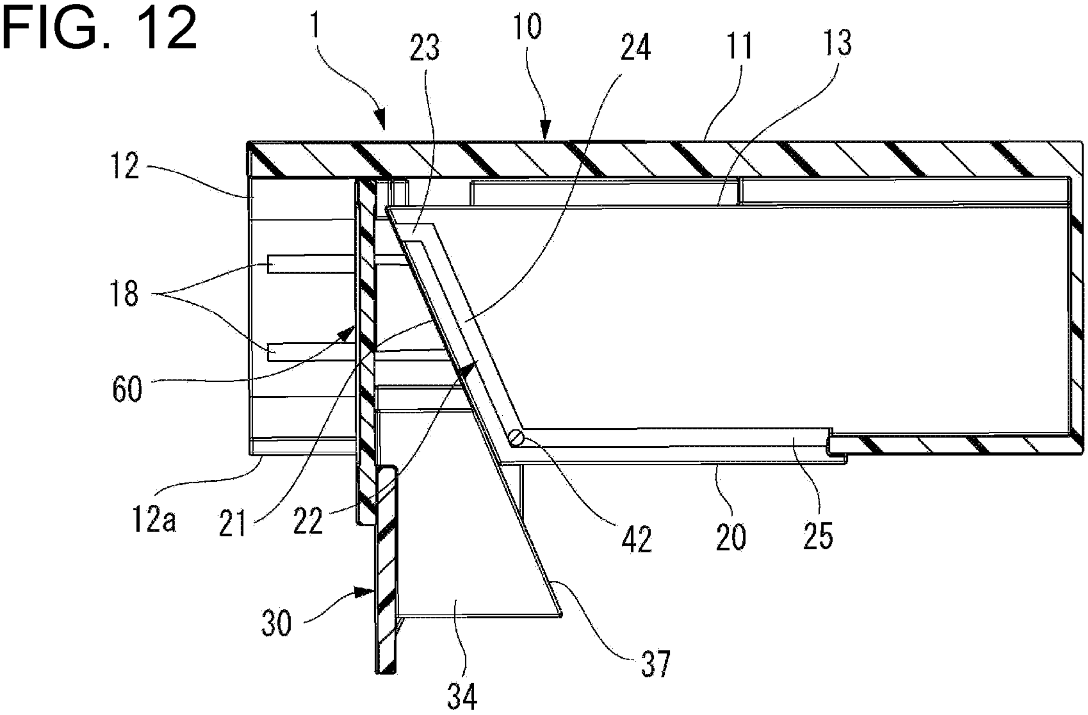
FIG. 12 is a cross-sectional view taken along line VIII-VIII of FIG. 5 when fitting is started.
Figure 13:
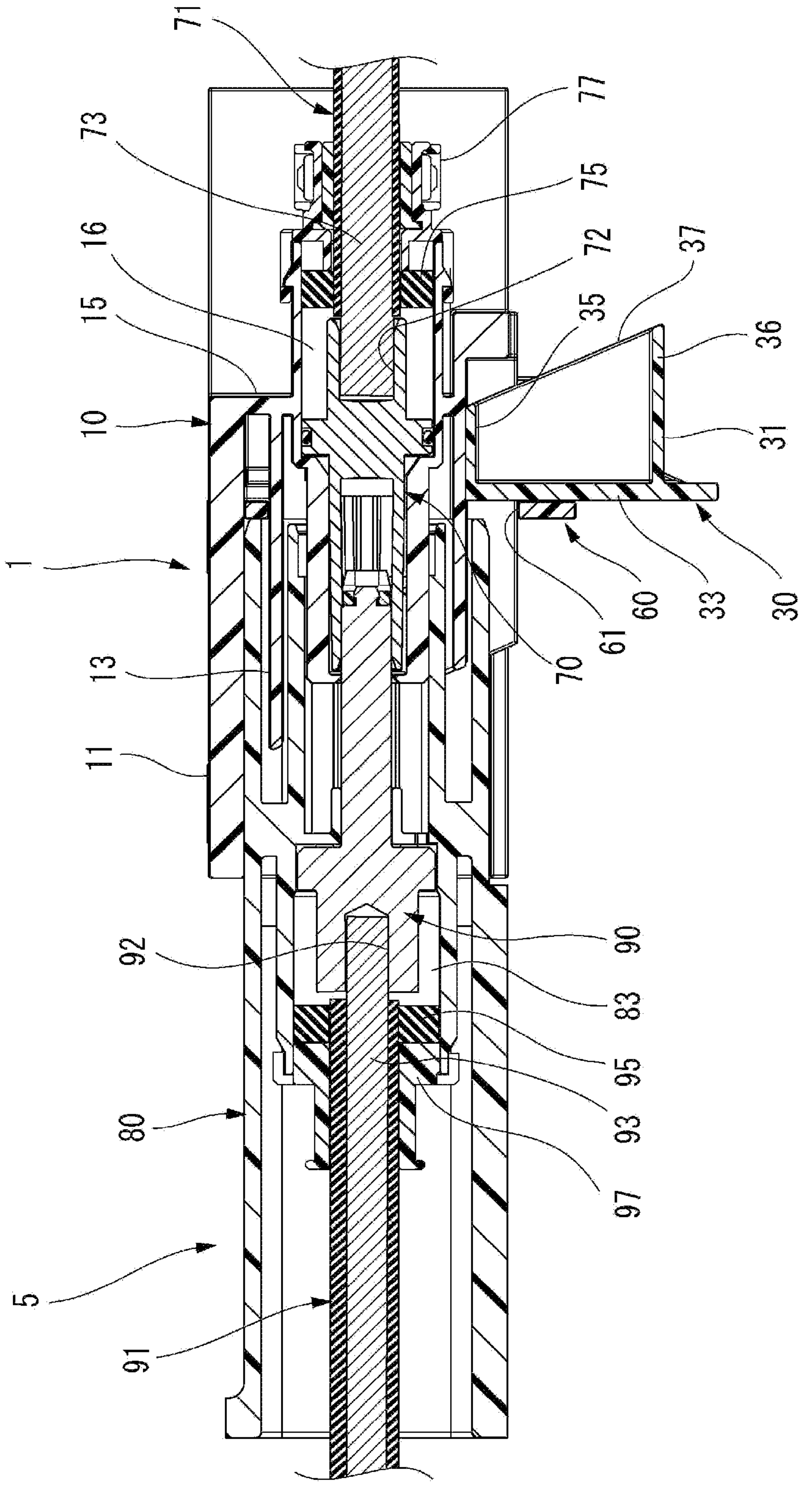
FIG. 13 is a vertical cross-sectional view of the connection terminal portion between the inlet and the inlet plug during fitting.
Figure 14:
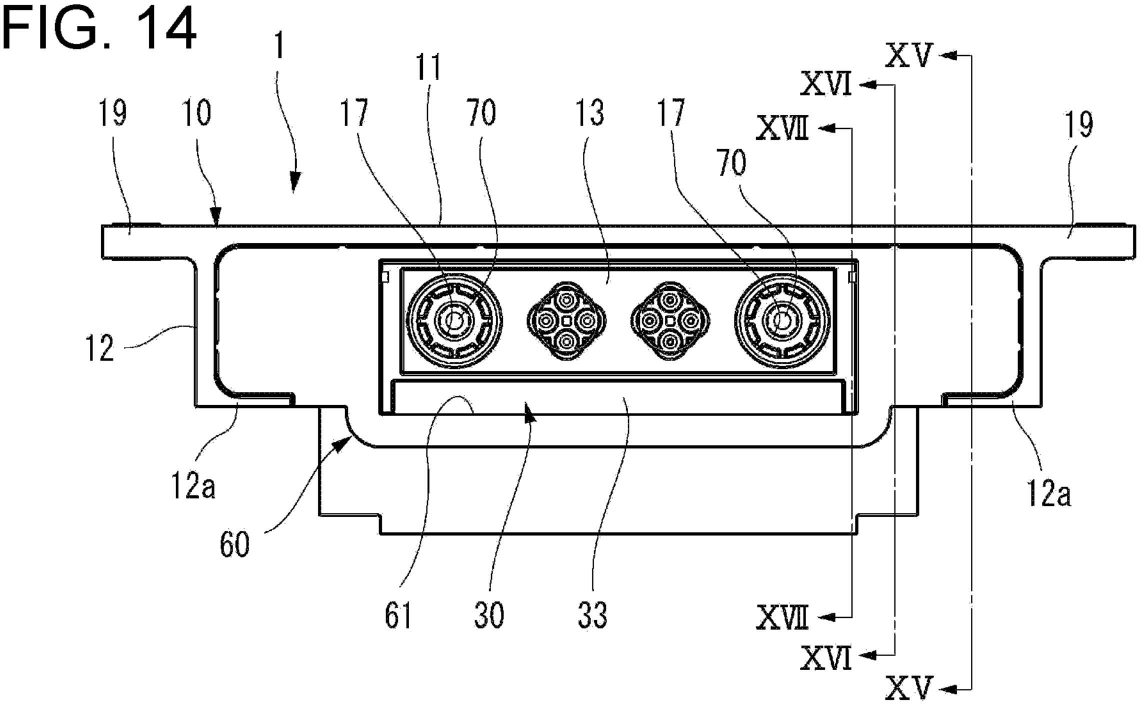
FIG. 14 is a front view, in which the inlet plug is omitted, of the inlet during fitting.
Figure 15:
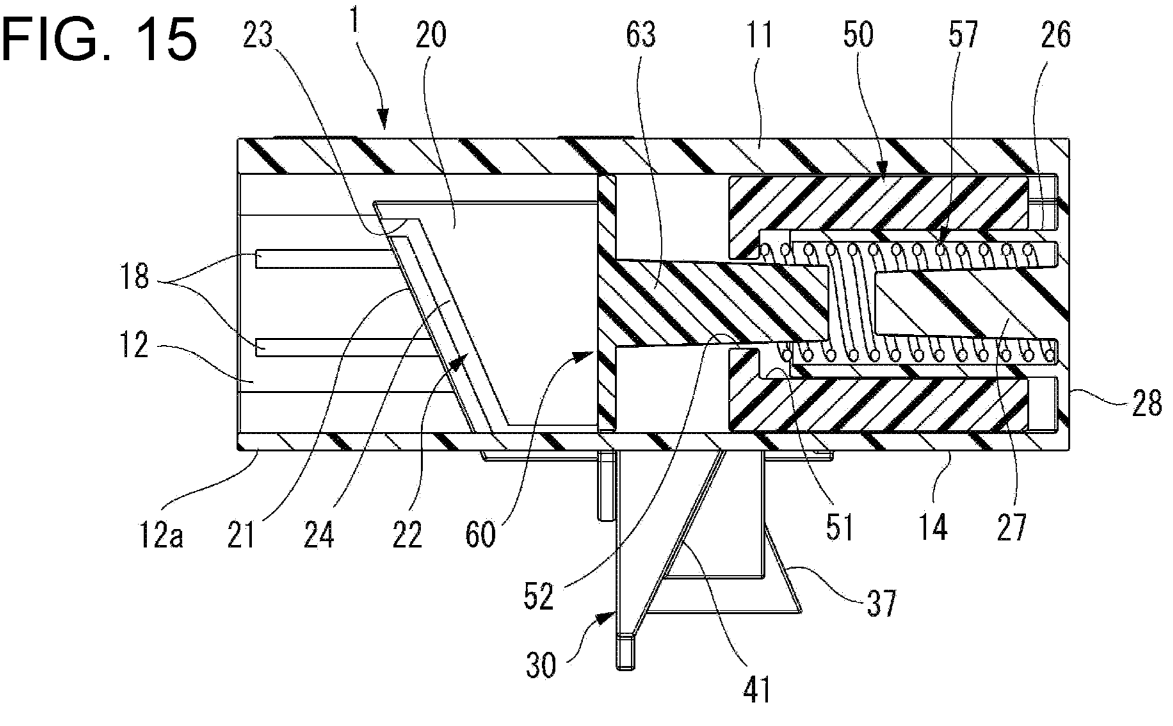
FIG. 15 is a cross-sectional view taken along line XV-XV of FIG. 14.
Figure 16:
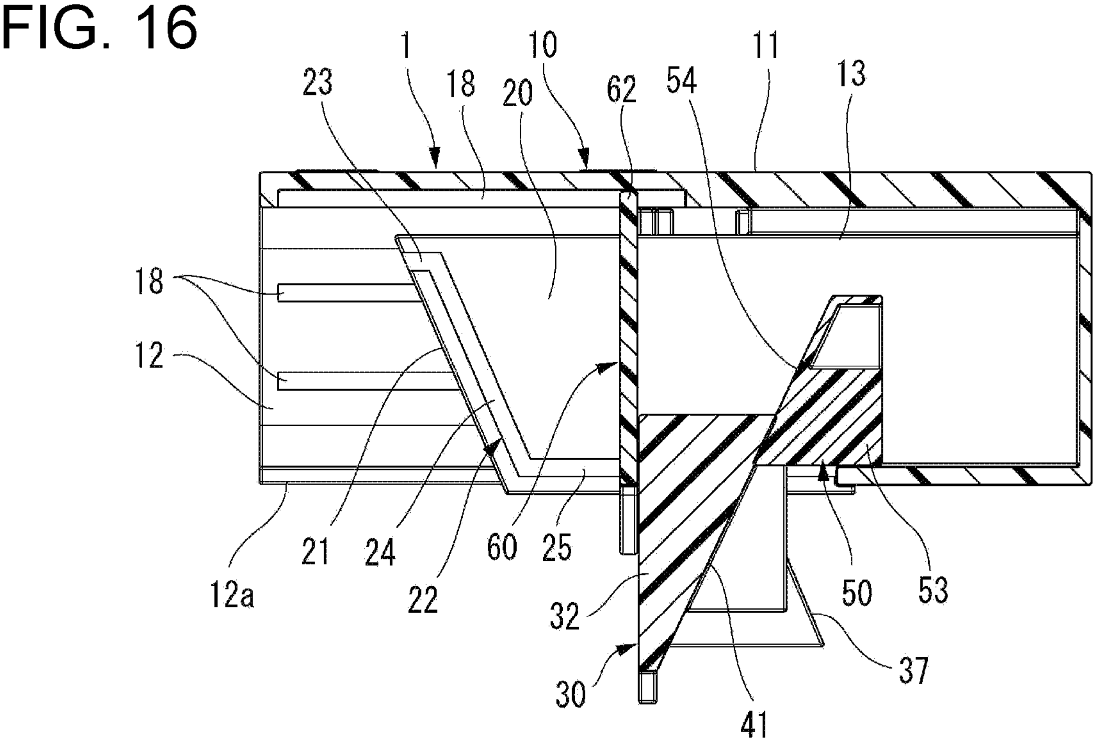
FIG. 16 is a cross-sectional view taken along line XVI-XVI of FIG. 14.
Figure 17:
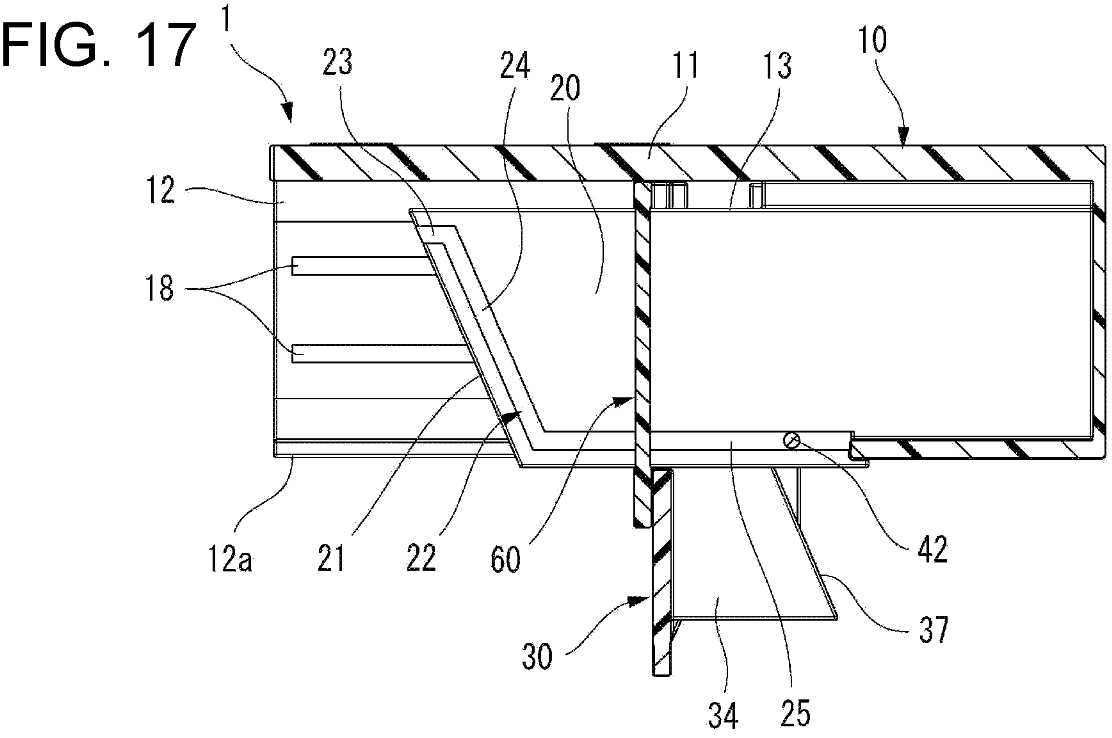
FIG. 17 is a cross-sectional view taken along line XVII-XVII of FIG. 14.

FIG. 10 is a vertical cross-sectional view of the connection terminal portion between the inlet 1 and the inlet plug 5 when fitting is started. FIG. 11 is a cross-sectional view taken along line VI-VI of FIG. 5 when fitting is started. FIG. 12 is a cross-sectional view taken along line VII-VII of FIG. 5 when fitting is started. FIG. 13 is a vertical cross-sectional view of the connection terminal portion between the inlet 1 and the inlet plug 5 during fitting. FIG. 14 is a front view, in which the inlet plug 5 is omitted, of the inlet 1 during fitting. FIG. 15 is a cross-sectional view taken along line XV-XV of FIG. 14. FIG. 16 is a cross-sectional view taken along line XVI-XVI of FIG. 14. FIG. 17 is a cross-sectional view taken along line XVII-XVII of FIG. 14.

(During Fitting)

In a state where the inlet 1 and the inlet plug 5 are not fitted to each other, as shown in FIGS. 1 and 2, the slide shutter 30 is disposed in front of the terminal accommodating portion 13 of the housing 10. As a result, the opening portion 61 of the front cover 60 is closed by the slide shutter 30, and the front surface opening 17 of the terminal accommodating chamber 16 in the terminal accommodating portion 13 is in a closed state of being covered by the slide shutter 30. Therefore, the connection terminal 70 of the inlet 1 is not exposed when the slide shutter 30 is closed. As a result, the inlet 1 is subjected to dust prevention and terminal protection, and is prevented from electric shock.

From this state, insertion and fitting of the inlet plug 5 into the inlet 1 is started. First, from the state shown in FIG. 2, the inlet plug 5 is moved toward the inlet 1 to start insertion and fitting into the plug housing 80.

Then, as shown in FIGS. 10 to 12, each pressing surface 87 of a tip end portion of the plug housing 80 of the inlet plug 5 is abutted against the front surface of the front cover 60, and thus the front cover 60 is pressed. Then, the slide shutter 30 urged forward by the spring 57 is pushed via the holder 50 toward the rear of the housing 10 against an urging force of the spring 57.

As a result, the first shutter inclined surface 37 slides relative to the housing inclined surface 21 of the housing 10, and thus the slide shutter 30 is in sliding contact with the sliding contact surface 64 of the front cover 60, and is moved obliquely downward toward the rear relative to the housing 10. Therefore, the opening portion 61 of the front cover 60 closed by the slide shutter 30 is opened, and the front surface opening 17 of the terminal accommodating chamber 16 in the terminal accommodating portion 13 is opened.

At this time, the guide protrusion 42 is moved along the inclined groove portion 24 of the guide groove 22, and thus the slide shutter 30 is guided obliquely downward toward the rear relative to the housing 10. Then the first shutter inclined surface 37 is separated from the housing inclined surface 21, so that no downward pressing force is applied to the slide shutter 30, which has been moved obliquely downward toward the rear relative to the housing 10. In this state, the guide protrusion 42 of the slide shutter 30 reaches a lower end of the inclined groove portion 24 of the guide groove 22. In addition, the engagement piece 43 of the slide shutter 30 is engaged with the lower engagement portion 65*b* of the front cover 60.

In this state, when the inlet plug 5 is further inserted and fitted into the inlet 1, as shown in FIGS. 13 to 17, the slide shutter 30 is pushed horizontally rearward relative to the housing 10 together with the holder 50. At this time, the guide protrusion 42 is moved along the horizontal groove portion 25 of the guide groove 22, and thus the slide shutter 30 is horizontally guided rearward relative to the housing 10. When the connection terminal 70 of the inlet 1 and the connection terminal 90 of the inlet plug 5 are fitted and connected to each other, the high-voltage cable 71 and the high-voltage cable 91 are electrically connected to each other.

(During Detachment)

When the inlet plug 5 is pulled out from the inlet 1 in order to detach the inlet plug 5 from the inlet 1, the connection terminal 90 of the inlet plug 5 is pulled out from the connection terminal 70 of the inlet 1. As a result, the electrical connection between the high-voltage cable 71 and the high-voltage cable 91 is released.

When the inlet plug 5 is pulled out, the slide shutter 30 and the front cover 60 are pushed by the urging force of the spring 57 out to the front of the housing 10 via the holder 50. At this time, the guide protrusion 42 of the slide shutter 30 is moved along the horizontal groove portion 25 of the guide groove 22, and thus the slide shutter 30 is horizontally guided toward the front of the housing 10.

When the guide protrusion 42 of the slide shutter 30 reaches a front end of the horizontal groove portion 25 of the guide groove 22, restriction of upward movement of the slide shutter 30 provided by engagement of the guide protrusion 42 with the horizontal groove portion 25 is released, and the first shutter inclined surface 37 of the slide shutter 30 and the housing inclined surface 21 are brought into an engageable state.

In this state, when the holder 50, the slide shutter 30, and the front cover 60 are pushed toward the front of the housing 10 by the urging force of the spring 57, the second shutter inclined surface 41 of the slide shutter 30 slides relative to the holder inclined surface 54 of the holder 50, thus the slide shutter 30 is in sliding contact with the sliding contact surface 64 of the front cover 60 and is pulled up.

In addition, the guide protrusion 42 is moved along the inclined groove portion 24 of the guide groove 22, and thus the slide shutter 30 is guided obliquely upward toward the front relative to the housing 10. In the slide shutter 30, when the guide protrusion 42 reaches an upper end of the inclined groove portion 24 of the guide groove 22, the engagement piece 43 is engaged with the upper engagement portion **65*a* of the front cover 60**.

In the inlet 1 where the inlet plug 5 is pulled out, the opening portion 61 of the front cover 60, which has been opened, is closed by the slide shutter 30, and the front surface opening 17 of the terminal accommodating chamber 16 in the terminal accommodating portion 13 is in the closed state of being covered by the slide shutter 30. Therefore, the connection terminal 70 of the inlet 1 is not exposed due to the closing of the slide shutter 30, thus the inlet 1 is subjected to dust prevention, terminal protection and is prevented from electric shock.

As described above, according to the inlet 1 of the present embodiment, the first shutter inclined surface 37 slides relative to the housing inclined surface 21 of the housing 10, so that the slide shutter 30 is slid in the direction intersecting the connector fitting direction to open the front surface opening 17. Therefore, according to the inlet 1 of the present embodiment, it is not necessary to lengthen a fitting hood portion of the inlet plug in consideration of opening and closing trajectories of the shutter as in a shutter-mechanism-equipped connector in related art.

In addition, in the inlet 1 according to the present embodiment, the guide groove 22 with which the guide protrusion 42 of the slide shutter 30 is engaged is formed in the housing 10.

Therefore, since the guide protrusion 42 of the slide shutter 30 is engaged with the guide groove 22 of the housing 10 to support an opening and closing operation, the opening and closing operation of the slide shutter 30 can be performed smoothly when the inlet plug 5 is fitted or detached.

In addition, the guide groove 22 includes the inclined groove portion 24 extending along the housing inclined surface 21, and the horizontal groove portion 25 that is continuous to a rear end portion of the inclined groove portion 24 and extends along the fitting direction.

Therefore, the slide shutter 30 can be moved along the inclined groove portion 24 to smoothly open and close the front surface opening 17 of the housing 10, and the slide shutter 30 can be moved along the horizontal groove portion 25 so as to be smoothly engaged with and detached from the inlet plug 5.

In addition, in the inlet 1 according to the present embodiment, the holder 50 is provided with the holder inclined surface 54, and the slide shutter 30 is provided with the second shutter inclined surface 41 that slides the slide shutter 30 in a direction intersecting a removal direction of the inlet plug 5 in accordance with a pressing force applied by the holder 50 in the removal direction of the inlet plug 5.

Therefore, when the inlet plug 5 is pulled out from the housing 10, the second shutter inclined surface 41 slides relative to the holder inclined surface 54 of the holder 50, so that the slide shutter 30 is slid in the direction intersecting the connector removal direction to close the front surface opening 17. As a result, after the inlet plug 5 is detached, the front surface opening (front opening) 17 of the housing 10 is closed by the slide shutter 30, and thus the connection terminal 70 can be protected.

In addition, in the inlet 1 according to the present embodiment, the holder 50 is constantly urged in the connector removal direction of the inlet plug 5 by the spring 57 that is the elastic member disposed between the holder 50 and the housing 10.

Therefore, the slide shutter 30 is pressed via the holder 50 in the connector removal direction by an urging force of the spring 57, and thus a closed state of the front surface opening 17 of the housing 10 can be satisfactorily maintained by the slide shutter 30. In addition, the spring 57 is disposed in the holder accommodating portion 14 on a rear side of the housing 10 and is separated from the front surface opening 17 of the housing 10. Therefore, the spring 57 away from the front surface opening 17 is less likely to be affected by dust, water, and the like.

It should be noted that the present invention is not limited to the above-described embodiment, and modifications, improvements, and the like can be made as appropriate. In addition, materials, shapes, dimensions, numbers, arrangement positions, and the like of the respective constituent elements in the above-described embodiment are set as desired and are not limited as long as the present invention can be achieved.

For example, although the slide shutter 30 is pushed by the inlet plug 5 via the front cover 60 in the above embodiment, the front cover 60 may be omitted and the slide shutter 30 may be directly pushed by the inlet plug 5.

In addition, although the inlet used in an electric vehicle or the like has been described as an example of a shutter-mechanism-equipped connector in the above embodiment, the connector of the present invention is not limited thereto. The present invention can be applied to various connectors based on the spirit of the present invention.

Here, features of the embodiment of the connector according to the present invention described above will be briefly summarized and listed in the following [1] to [5].

[1] A connector (inlet 1) includes: a housing (10) configured to accommodate a connection terminal (70);

- a slide shutter (30) configured to open and close a front opening (front surface opening 17) of the housing (10) to which a mating connector (inlet plug 5) is to be fitted;
- a first shutter inclined surface (37) provided on the slide shutter (30); and
- a housing inclined surface (21) provided on the housing (10) so as to face the first shutter inclined surface (37) and configured to slide the slide shutter (30) in a direction intersecting a connector fitting direction to open the front opening (front surface opening 17) in accordance with a pressing force applied in the connector fitting direction by the mating connector (inlet plug 5).

[2] The connector (inlet 1) according to [1], in which the slide shutter (30) has a guide protrusion (42); and a guide groove (22) is formed in the housing (10) and is engaged with the guide protrusion (42) so as to support an opening and closing operation of the slide shutter (30).

[3] The connector (inlet 1) according to [2], in which the guide groove (22) includes an inclined groove portion (24) extending along the housing inclined surface (21) and a horizontal groove portion (25) that is continuous to a rear end portion of the inclined groove portion (24) and extends along the connector fitting direction.

[4] The connector (inlet 1) according to [3] further includes: a holder (50) disposed in the housing (10) so as to be movable along the connector fitting direction and constantly urged in a connector removal direction of the mating connector (inlet plug 5), in which a holder inclined surface (54) is provided on the holder (50); and a second shutter inclined surface (41) is provided on the slide shutter (30) so as to face the holder inclined surface (54) and is configured to slide the slide shutter (30) in a direction intersecting the connector removal direction to close the front opening (front surface opening 17) in accordance with a pressing force applied in the connector removal direction by the holder (50).

[5] The connector (inlet 1) according to [4], in which the holder (50) is constantly urged in the connector removal direction by an elastic member (spring 57) disposed between the holder (50) and the housing (10).

According to the connector having the above configuration [1], the first shutter inclined surface slides relative to the housing inclined surface of the housing, so that the slide shutter is slid in the direction intersecting the connector fitting direction to open the front opening. Therefore, according to the connector of the present configuration, it is not necessary to lengthen the fitting hood portion of the mating connector in consideration of opening and closing trajectories of the shutter as in the shutter-mechanism-equipped connector in the related art.

According to the connector having the above configuration [2], since the guide protrusion of the slide shutter is engaged with the guide groove of the housing to support the opening and closing operation, the opening and closing operation of the slide shutter can be performed smoothly when the mating connector is fitted or detached.

According to the connector having the above configuration [3], the slide shutter can be moved along the inclined groove portion, and thus the opening and closing operation of the front opening of the housing can be performed smoothly. In addition, the slide shutter can be moved along the horizontal groove portion, and thus fitting and detaching can be smoothly performed relative to the mating connector.

According to the connector having the above configuration [4], when the mating connector is pulled out from the housing, the second shutter inclined surface slides relative to the holder inclined surface of the holder, so that the slide shutter is slid in the direction intersecting the connector removal direction to close the front opening. As a result, after the mating connector is detached, the front opening of the housing is closed by the slide shutter, and thus the connection terminal can be protected.

According to the connector having the above configuration [5], the slide shutter is pressed via the holder in the connector removal direction by an urging force of the elastic member, and thus a closed state of the front opening of the housing can be satisfactorily maintained by the slide shutter. In addition, the elastic member is disposed in a holder accommodating portion on a rear side of the housing, and is separated from the front opening of the housing. Therefore, the elastic member away from the front opening is less likely to be affected by dust, water, and the like.

What is claimed is:

1. A connector comprising:

a housing including a front opening through which a mating connector is to be fitted;

a slide shutter configured to open and close the front opening of the housing;

a first shutter inclined surface provided on the slide shutter;

a housing inclined surface provided on the housing so as to face the first shutter inclined surface and configured to slide the slide shutter in a direction intersecting a connector fitting direction to open the front opening in accordance with a pressing force applied in the connector fitting direction by the mating connector, wherein the slide shutter includes a front surface that opposes the front opening if the slide shutter closes the front opening, and the front surface protrudes outside of the housing if the slide shutter opens the front opening wherein the slide shutter has a guide protrusion; and a guide groove is formed in the housing and is engaged with the guide protrusion so as to support an opening and closing operation of the slide shutter;

wherein the guide groove includes: an inclined groove portion extending along the housing inclined surface; and a horizontal groove portion that is continuous to a rear end portion of the inclined groove portion and extends along the connector fitting direction.

2. The connector according to claim 1, further comprising:

a holder disposed in the housing so as to be movable along the connector fitting direction and constantly urged in a connector removal direction of the mating connector, wherein a holder inclined surface is provided on the holder; and a second shutter inclined surface is provided on the slide shutter so as to face the holder inclined surface and is configured to slide the slide shutter in a direction intersecting the connector removal direction to close the front opening in accordance with a pressing force applied in the connector removal direction by the holder.

3. The connector according to claim 2, wherein the holder is constantly urged in the connector removal direction by an elastic member disposed between the holder and the housing.

* * * * *